United States Patent

[11] 3,625,194

[72] Inventor Henri Pinhas
 Paris, France
[21] Appl. No. 823,719
[22] Filed May 12, 1969
[45] Patented Dec. 7, 1971
[73] Assignee Serdex-Societe D'Etudes, de Recherches de Diffusion Et D'Exploitation
 Rue Aristide-Briand, France

[54] TRITERPENIC ALCOHOLS, PROCESS FOR THEIR PREPARATION AND THERAPEUTICAL COMPOSITIONS CONTAINING SAME
 16 Claims, 4 Drawing Figs.
[52] U.S. Cl..................................................... 424/238,
 260/397.2, 260/397.25
[51] Int. Cl........................................................C07c169/48

[50] Field of Search............................................ 260/397.2,
 Machine Searched

[56] References Cited
 UNITED STATES PATENTS
 3,250,765 5/1966 Jeger et al..................... 260/239.55

Primary Examiner—Elbert L. Roberts
Attorneys—Oldham & Oldham, Albert H. Oldham, Vern L. Oldham and Edwin W. Oldham ABSTRACT: Citrostadienol, cycloartenol, 24-methylene-cycloartanol and 3 β-hydroxy-24-methyl-9-19-cyclo-9 β-lanosta-23-ene have analeptic, anti-inflammatory and connective tissue harmonizing properties.

Inventor:
Henri Pinhas
By: Oldham & Oldham
Atty.

TRITERPENIC ALCOHOLS, PROCESS FOR THEIR PREPARATION AND THERAPEUTICAL COMPOSITIONS CONTAINING SAME

This invention relates to therapeutical compositions containing certain triterpenic alcohols. These alcohols exhibit good analeptic, anti-inflammatory and connective tissue harmonizing properties and, therefore, the compositions of the invention are useful, for example, for the treatment of paradonpathies and of rheumatic conditions.

The invention consists in pharmaceutical compositions comprising a pharmaceutically acceptable carrier or excipient and, as active principle, citrostadienol, cycloartenol, 24-methylene-cycloartanol, 3β-(hydroxy-24-methyl-9-19-cyclo-9 β-lanosta-23-ene or a mixture thereof.

Citrostadienol is 3βhydroxy-4 αmethyl-Δ7,24(28)stigmastadiene.

Cycloartenol is 3β-hydroxy-9-19 cyclo-9β-24-methylene-cycloartanol is 3β-hydroxy-24-methylene-9-19-cyclo 9β-lanostane.

Figure 1:
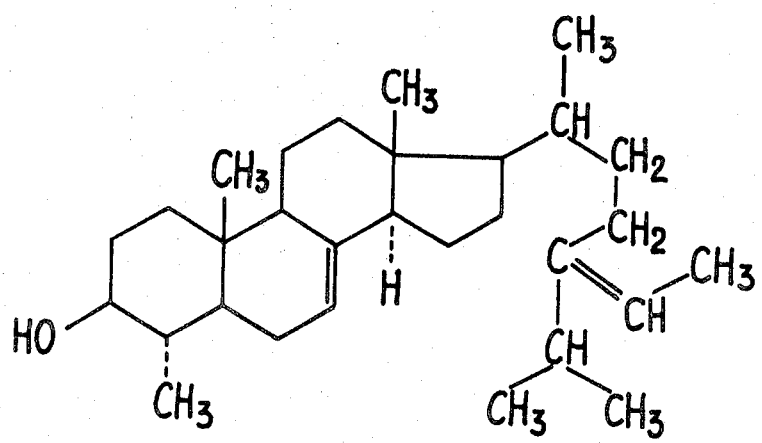
Figure 2:
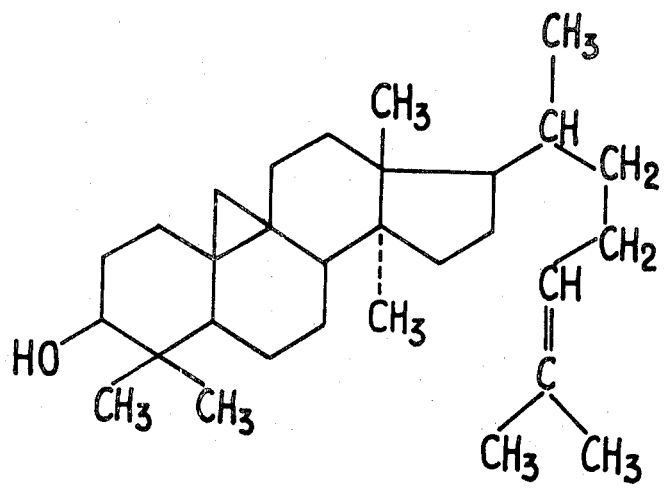
Figure 3:
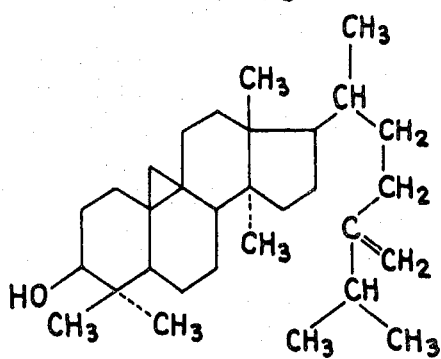
Figure 4:
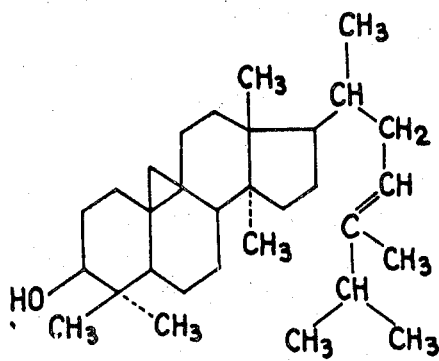

The formulas of said active compounds are illustrated in FIGS. 1, 2, 3 and 4 of the accompanying drawing.

3β-hydroxy-24-methyl-9-19-cyclo-9β-lanosta-23-ene is a new compound. The invention includes also this compound which is named hereunder, for the sake of brevity, "-Cyclosadol." It melts at 132°–134° C. and has an optical rotation of $[\alpha]_D$ of +41°. Its acetylated derivative melts at 121°-122° C. and has an $[\alpha]_D$ of +50°.

The structure of Cyclosadol is ascertained by the following reactions:

Hydrogenation of Cyclosadol and 24-methylene cycloartanol gives the same compound, thus assigning the general structure.

Degradation of the ethylenic double bond of cyclosadol gives the corresponding steroid having 26 carbon atoms and methylisopropylketone, which indicates the site of the double bond.

The other active compounds are already known products; however their therapeutical properties had never been demonstrated heretofore. Citrostadienol melts at 161°–163° C. and has an $[\alpha]_D$ of +23°; its acetate melts at 142°–145° C. Cycloartenol melts at 90°–95° C. and its acetate at 113°–114° C. 24-Methylene-cycloartanol melts at 114°–116° C. and has an $[\alpha]_D$ of +54°. All optical rotation values were measured in chloroform at 24° C.

The invention consists also in a process for the extraction of citrostadienol, cycloartenol, 24-methylene-cycloartanol and/or 3β-hydroxy 24-methyl-9-19-cyclo-9β-lanosta-23-ene from the unsaponifiable matters of plants, comprising chromatographying the unsaponifiable matters by eluting with solvents of increasing polarity (one of which is ether), removing the β-sitosterol contained in the ether fraction, isolating the desired compounds by chromatography of this fraction and then collecting the desired compounds.

For example, citrostadienol is prepared from the unsaponifiable of maize oil while cycloartenol may be obtained from the same unsaponifiable matter and from those of nux vomica and of alcohol extraction residues of potato leaves. 24-Methylene-cycloartanol and cyclosadol accompany generally cycloartenol.

The starting unsaponifiable matters may be obtained as described in U.S. Pat. vol. 17, 1965, page 873.

Extraction of such triterpenic alcohols is advantageously carried out by passing the vegetable unsaponifiable matters on a column of alumina or silica gel.

Generally, the ether fraction is taken up in the hot with diethyl ether, using about 4 volumes of this solvent. After cooling, the β-sitosterol crystals are separated and the ether solution is concentrated to give a residue which is dissolved in the hot in a small amount of acetone. The reaction mixture is left standing in the cold, for example during 24 hours ar −10° C. and crystals A are then separated from the mother liquors which, on concentration, give a reddish oil B.

Crystals A are chromatographed on a column of silica gel, eluting with a petroleum ether-diethyl ether mixture. This procedure gives cycloartenol and, in the case of maize oil unsaponifiables, citrostadienol, in subsequent fractions.

When oil B is submitted to successive chromatographies, a further amount of active compounds is isolated.

To prepare cyclosadol or 24-methylene-cycloartanol, an extraction is carried out, as described above, for example on the unsaponifiable matter of maize oil seeds, up to the stage of the separation of β-sitosterol crystals.

The ether solution is then concentrated and the resulting residue is chromatographed twice over silica, to obtain fraction A having the same Rf value, on thin layer chromatography over silica gel (Kieselgel G), as a sample of cycloartenol.

On acetylation of this fraction A a fraction B is obtained which exhibits a single spot on thin layer chromatography over Kieselgel G. However, on a chromatoplate of Kieselgel impregnated with 12 percent of silver nitrate, fraction B exhibits three marked spots on two successive elutions with petroleum ether-diethyl ether over a length of about 18 cm.

To those three spots correspond the following materials having the following Rf values:

| | |
|---|---|
| Acetyl cyclosadol | 0.70 |
| Acetyl cycloartenol | 0.67 |
| Acetyl 24-methylene cycloartanol | 0.55 |

The relative Rf values of these three compounds, with respect to pure cycloartenol acetate under the same conditions as above are 1.04, 1.00 and 0.84, respectively.

Said fraction B is chromatographed on a column of silica impregnated with 10 percent of silver nitrate and fractionation is effected every 5 cc. Thus are obtained, by order of elution, the acetyl derivatives of cyclosadol, of cycloartenol and of 24-methylene cycloartanol.

The nuclear magnetic resonance spectra show, for these three compounds, two proton doublets at 0.33 and 0.60 p.p.m. characteristic of the 19-cyclopropane methylene in 4-dimethyl triterpenic compounds.

The alcohols are released on treatment with an alkali metal hydroxide such as methanolic potassium hydroxide, at room temperature, to give cyclosadol, cycloartenol and 24-methylene-cycloartanol.

Four examples of the extraction of the active principle of the drug are given below purely for illustrative purposes, the fourth example describing more particularly the extraction of 24-methylene-cycloartanol and of cyclosadol which accompany cycloartenol.

EXAMPLE 1

300 g. of unsaponifiable matter of maize oil are chromatographed on a column having a diameter of 13 cm. containing 6 kg. of alumina. Elution is carried out successively with 39 liters of petroleum ether (30–70), 22 liters of benzene and 25 liters of diethyl ether.

The residue obtained on evaporation of the diethyl ether (60 g.) is triturated in the hot with 250 cc. of diethyl ether.

After cooling of the solution, white β-sitosterol crystals are obtained by suction filtering. The ether phase is then concentrated and the residue is dissolved in the hot in a small amount of acetone.

The solution is left standing 24 hours at −10° C. and 18 g. of almost white crystals (crystals A) are obtained after suction filtration.

The mother liquors of the crystallization from acetone are evaporated, leaving a thick reddish oil (oil B).

Crystals A are chromatographed over silica gel, in the following manner:

1.1 g. of crystals A are chromatographed on a column having a diameter of 22 mm. containing 40 g. of silica gel (0.05–0.20 mm.). Elution is carried out with a petroleum ether (7 volumes)-diethyl ether (3 volumes) mixture and fractionation is carried out every 20 cc. The fractions exhibiting a single spot on thin layer chromatography and having the same characteristics (Rf, color of spots) are combined.

Thus first 199 mg. of cycloartenol, followed by 200 mg. of citrostadienol are obtained.

Oil B (51 g.) still contains cycloartenol and citrostadienol. This residue is chromatographed on a column having a diameter of 53 mm. containing 1 kg. of alumina, and elution is carried out with a petroleum ether (6 volumes)-diethyl ether (1 volume) mixture. The fractions containing predominantly cycloartenol, citrostadienol or a mixture of these two materials, are combined and evaporated (26 g.). A second chromatography on alumina gives 18 g. of a crop with a very high cycloartenol and citrostadienol content.

Endly, another chromatography on silica gel, under the same conditions used for crystals A, isolated 3.1 g. of citrostadienol and 4.5 g. of a mixture of cycloartenol, 24-methylene-cycloartenol and cyclosadol.

EXAMPLE 2

Unsaponifiable matter of the Nux vomica is treated in the same manner as in example 1 by chromatography over alumina, and then on silica gel, using the same solvents. Thus, from 25 g. of unsaponifiable, about 0.75 g. of cycloartenol are obtained.

EXAMPLE 3

From 6 g. of the unsaponifiable matter of potato leaves, about 0.6 g. of cycloartenol are isolated, under the conditions described in example 1, after column chromatography.

EXAMPLE 4

300 g. of the unsaponifiable matter of the maize oil are chromatographed on a column having a diameter of 13 cm. containing 6 kg. of alumina. Successive elutions are carried out with 39 liters of petroleum ether (30–70), 22 liters of benzene and 25 liters of diethyl ether.

The residue obtained on evaporation of the diethyl ether (69 g) is triturated in the hot with 250 cc. of diethyl ether.

After cooling of the solution, white β-sitosterol crystals are obtained by suction filtration.

The ether phase is then concentrated and then carefully chromatographed twice on silica (eluent: petroleum ether-diethyl ether 10:1) to remove only fraction A having the same Rf value on thin layer chromatography on Kieselgel G than a sample of cycloartenol. This fraction A is acetylated at room temperature by the usual method, with acetic anhydride in pyridine. Thus a fraction B is obtained melting at 80°–90° C. which is a mixture of cyclosadol, cycloartenol and 24-methylene-cycloartanol.

Each of these pure compounds is isolated by chromatography according to the following technique:

A column having a diameter of 30 mm. is packed to a depth of about 36 cm. with a suspension of silica G impregnated with 10 percent of silver nitrate in a petroleum ether-diethyl ether 20:1 mixture. The column is protected from light with aluminum paper. On the well packed column substantially solvent free on its surface is added delicately and as uniformly as possible a powder consisting of a mixture of 5 g. of silica and 4.4 g. of fraction B. Elution is carried out with petroleum ether-diethyl ether (500 cc. of solvent).

Fractions 8–9 contain 0.510 g. of acetyl cyclosadol and traces of acetyl cycloartenol.

Fractions 10–11 contain 0.600 g. of acetyl cyclosadol and cycloartanol.

Fractions 15–18 contain 0.520 g. of acetyl cycloartenol.

Fractions 32–43 contain 0.270 g. of acetyl 24-methylene-cycloartenol.

The other fractions are mixtures which may be separated by further chromatographic treatment, under the same conditions.

Fractions 8–9 are chromatographed over 100 g. of silica impregnated with 12 percent of silver nitrate, under the same conditions as above, with, however, fractionation every 5 cc. This procedure isolates 0.220 g. of highly pure acetyl cyclosadol which recrystallizes most readily from 25 cc. of methanol.

These acetyl derivatives are readily saponified by treatment, during 24 hours, at room temperature, with 0.5N methanolic potassium hydroxide.

The free cyclo-triterpenic alcohols recrystallize from methanol.

The results of pharmacological and toxicological tests demonstrating the properties of the active compounds together with their harmlessness are given below.

Increasing dosages of the four compounds, from 0.1 to 5 g./kg., were administered to mice and rats, by individual forcible feeding by means of a probang.

During the test period, the animals were maintained at laboratory temperature (22–23° C.) and were kept under observation during 14 days after administration.

At the dosages administered, no intoxication symptom was found. The animals exhibited a normal behavior, and their weight increase was comparable to that of the controls.

On autopsy, carried out at the end of the test, no macroscopic injury of any of the principal organs could be noted.

Because of the very low toxicity of the product, $LD_{50}$ could not be determined or even approached.

The anti-inflammatory activity of the compounds was evidenced by the kaolin test and by the test of carraghenin-induced granuloma in rat.

KAOLIN TEST

Intraplantar injection of a kaolin suspension induces in rat an inflammation the degree of which is evaluated by the measure of the volume of the paw by means of Giono and Chevillard's plethysmometre.

The effects of the compounds on the evolution of this inflammation are studied.

The results, expressed as percent inhibition of the inflammation, are reported below.

| Inhibition of inflammation after | 5 hrs. | 26 hrs. | 50 hrs. |
| --- | --- | --- | --- |
| Cycloartenol 25 mg./kg. | 17% | 14% | 0% |
| Citrostadienol 25 mg./kg. | 15% | 13% | 0% |
| Cyclosadol 25 mg./kg. | 18% | 15% | 0% |
| 24-methylene-cycloartanol 25 mg./kg. | 15% | 13% | 0% |

Between 5 and 26 hours, the compounds exhibit a substantially stationary anti-inflammatory activity. This activity becomes nil after 50 hours.

It is apparent from the aforesaid pharmacological and toxicological tests that cycloartenol, citrostadienol, 24-methylene cycloartanol, cyclosadol and mixtures thereof are beneficially useful in human therapeutics, particularly as analeptic, connective tissue harmonizing and anti-inflammatory drugs.

Thus, the compositions according to the invention may be used in the treatment of parondopathies and of rheumatic conditions.

For such applications, they are advantageously formulated for oral administration, the active principle being combined with the usual carriers and excipients suitable for this route of administration. Thus, generally, 8–20 mg. of active principle are administered daily.

A suitable pharmaceutical formulation is formulated, for example, in the form of coated tablets containing each:

| | |
| --- | --- |
| active principle | 2–5 mg. |
| starch, magnesium stearate, potato starch, lactose, coating excipients | q.s; to make 1 coated tablet |

Having now described our invention what we claim as new and desire to secure by Letters Patent is:

1. A pharmaceutical composition comprising, as active principle, a triterpenic alcohol selected from the group consisting of 4β-hydroxy-4Δ-methyl Δ7,24(28)stigmastadiene, 3β-hydroxy-24-methylene-9-19-cyclo-9β-lanostane, 3β-hydroxy-24-methyl-9-19-cyclo-9β-lanosta-23-ene and mixtures thereof, in admixture with a pharmaceutically acceptable excipient.

2. A composition as claimed in claim 1, formulated for the oral administration of 8–20 mg. of active principle per 24 hours.

3. A composition as claimed in claim 2, formulated in unit dosage form.

4. A composition as claimed in claim 3, wherein each unit dose contains 2–5 mg. of active principle.

5. A composition as claimed in claim 3, in the form of coated tablets.

6. 3β-hydroxy-24-methyl-9-19-cyclo-9β-lanosta-23-ene.

7. A process for the extraction of triterpenic alcohols selected from the group consisting of 3β-hydroxy-4α-methyl Δ7,24(8)stigmastadiene, 3β-hydroxy 9-19-cyclo-9β-lanosta-24-ene, 3β-hydroxy-249-19-cyclo-9β-lanostane, and 3β-hydroxy-24-methyl-9-19-cyclo-9β-lanosta-23-ene from the unsaponifiable matters of plants, comprising chromatographying the unsaponifiable matters by eluting with solvents of increasing polarity one of which is ether, removing the β-sitosterol from the ether fraction, isolating the desired compounds by chromatography of this fraction and collecting the desired compounds.

8. Process as claimed in claim 7, wherein the unsaponifiable matters are chromatographed on a column of alumina.

9. Process as claimed in claim 7, wherein the unsaponifiable matters are chromatographed on silica gel.

10. Process as claimed in claim 7, wherein the solvents of increasing polarity are petroleum ether, benzene, ether and ethyl acetate.

11. Process as claimed in claim 7, wherein the β-sitosterol is removed from the ether fraction by concentrating this fraction, taking it up into ether and cooling it to precipitate β-sitosterol crystals which are then removed.

12. Process as claimed in claim 7, wherein the desired compounds are isolated by taking up the ether fraction — from which the β-sitosterol has been removed — with acetone, by allowing to rest during 24 hours at −10° C. to precipitate crystals and by chromatographying said crystals of desired products with elution using a petroleum ether-ether mixture.

13. Process as claimed in claim 12, wherein the mother liquors from the crystallization in acetone are concentrated until an oil is obtained which is then chromatographed to give a second crop of desired products.

14. Process as claimed in claim 7, wherein the unsaponifiable matter of nux vomica and of the residue of the alcohol extraction of potato leaves is chromatographed, and 3β-hydroxy-9-19-cyclo-9β-lanosta-24-ene is isolated.

15. Process as claimed in claim 7, wherein the desired compounds are isolated by concentrating the ether fraction from which the β-sitosterol has been removed by chromatographying the residue twice on silica gel, by acetylating the chromatographic fraction having the same Rf as a 3β-hydroxy-9-19-cyclo-9β-lanosta-24-ene sample in a thin layer chromatography test on silica gel impregnated with silver nitrate with elution using petroleum ether-ether and by releasing the desired products from their thus separated acetates by treatment with an alkali metal hydroxide in alcohol solution.

16. Process as claimed in claim 15, wherein the unsaponifiable matter of maize oil is chromatographed and 3β-hydroxy-4 α-methyl Δ7,24(28)stigmastadiene, 3β-hydroxy-9-19-cyclo-9β-lanosta-24-ene, and 3β-hydroxy-24-methyl-9-19-cyclo-9β-lanosta-23-ene are isolated.

* * * * *

UNITED STATES PATENT OFFICE
CERTIFICATE OF CORRECTION

Patent No. 3,625,194     Dated December 7, 1971

Inventor(s) Henri Pinhas

It is certified that error appears in the above-identified patent and that said Letters Patent are hereby corrected as shown below:

Claim 1, column 5, line 3, "4$\beta$-hydroxy-4$\alpha$-methyl$\Delta$ 7,24(28) stigmastadiene," should be
-- 3$\beta$-hydroxy-4$\alpha$-methyl $\Delta$ 7,24(28) stigmastadiene --

Claim 7, column 5, line 20, "(8)" should be -- (28) --

Claim 7, column 5, line 21, "3$\beta$-hydroxy-249-19-cyclo-9$\beta$-lanostane," should be
-- 3$\beta$-hydroxy-24-methylene-9-19-cyclo-9 $\beta$-lanostane, --

Priority is based on French Application No. 151,662 dated May 14, 1968 and French Application No. 177,578 dated December 11, 1968

Signed and sealed this 13th day of June 1972.

(SEAL)
Attest:

EDWARD M. FLETCHER, JR.        ROBERT GOTTSCHALK
Attesting Officer              Commissioner of Patents